United States Patent [19]
Shumate, Jr.
[11] 3,753,133
[45] Aug. 14, 1973

[54] TRIGGER CIRCUIT FOR RECORDING AND TRANSMITTING SAMPLED ANALOG WAVEFORMS

[75] Inventor: Paul William Shumate, Jr., Basking Ridge, N.J.

[73] Assignee: Bell Telephone Laboratories Incorporated, Murray Hill, N.J.

[22] Filed: Apr. 5, 1972

[21] Appl. No.: 241,204

[52] U.S. Cl. .................. 328/151, 307/246, 307/261, 328/28, 328/132, 340/347 AD, 340/347 SH
[51] Int. Cl. .... H03k 5/08, H03k 5/153, H03k 13/17
[58] Field of Search .................... 307/235 R, 235 A, 307/246, 261, 268; 328/132, 150, 151, 28, 146, 147; 340/347 AD, 347 SH

[56] References Cited

UNITED STATES PATENTS 3,588,885 6/1971 Schaal .......................... 340/347 AD
3,668,691 6/1972 Sergo, Jr. ...................... 340/347 AD

OTHER PUBLICATIONS

Kazi et al., "Analog-to-Digital Pulse Converter," IBM Tech. Disc. Bull., Vol. 12, No. 10, p. 1541–1542, 3/1970.

Gambrel, "Sample and Hold Circuit," IBM Tech. Disc. Bull., Vol. 11, No. 8, p. 908–909, 1/1969.

*Primary Examiner*—John W. Huckert
*Assistant Examiner*—L. N. Anagnos
*Attorney*—W. L. Keefauver

[57] ABSTRACT

A trigger circuit is provided for generating a digital pulse each time the amplitude of an analog input signal increases by an amount greater than a first voltage increment or decreases by an amount greater than a second voltage increment. The circuit features a sample and hold circuit in combination with a pair of operational amplifiers having current summing points in their input circuitry for comparing the "last look" value of the input signal, the current value of the input signal, and the first and second voltage increments.

10 Claims, 3 Drawing Figures

TRIGGER CIRCUIT FOR RECORDING AND TRANSMITTING SAMPLED ANALOG WAVEFORMS

BACKGROUND OF THE INVENTION

1. Field of the Invention

This invention relates to digital systems for recording and transmitting sampled analog waveforms and, more particularly, to a circuit for triggering the recording of an experimental analog parameter at the rate at which the parameter varies with respect to time.

2. Prior Art

Prior art trigger circuits usually employ an analog sample and hold circuit for periodically taking and storing a sample of an analog signal which is representative of the experimental parameter that is to be recorded. The amplitude of each such stored sample is compared with the instantaneous amplitude of the signal for the purpose of determining if a predetermined proportional change in the signal has occurred over the preceding periodic interval.

Many experimental parameters vary bidirectionally at unpredictable rates. However, most of these prior art trigger circuits are incapable of detecting bidirectional changes in the input waveform.

Moreover, most of the prior art trigger circuits require a timing circuit for periodically comparing the stored information with the real-time value of the input waveform. As a result, the circuits are constrained to sample and compare the parameter at fixed time intervals and are incapable of providing for the recording of an experimental parameter at the rate at which the parameter varies with respect to time. Simply reducing the interval between sampling will not cure the problem because such a change would still not enable the parameter to only be recorded when the value of the parameter has changed by a predetermined amount.

Consequently, it is an object of this invention to sample an analog signal at a rate which is proportional to the rate at which the signal varies with respect to time.

It is another object of this invention to provide a circuit which records an analog signal at a first rate when the amplitude of the signal is varying in a first direction with respect to its last sampled value and which records the signal at a second rate when the amplitude of the signal is varying in a second direction with respect to its last sampled value.

It is yet another object of this invention to provide a configuration of an asynchronous trigger circuit which depends upon neither an external nor an internal timing circuit for controlling the comparator function.

SUMMARY OF THE INVENTION

The invention lies in an asynchronous analog trigger circuit which generates a digital pulse each time the magnitude of an analog input signal changes by an amount exceeding a predetermined voltage increment.

The circuit primarily comprises a combination of a sample and hold circuit and first and second amplifiers having current summing points in their input circuitry. A sample of the input signal is stored in the sample and hold circuit and is continuously compared in the amplifier circuits with the current value of input signal and the voltage increments to determine if the amplitude of the input signal has either increased by an amount exceeding the first voltage increment or decreased by an amount exceeding the second voltage increment. Each time the input signal changes by an amount exceeding either of the voltage increments, the circuit generates a trigger pulse and recycles itself by using the output signal to trigger a new sampling of the input signal.

DETAILED DESCRIPTION OF THE INVENTION

Figure 1:
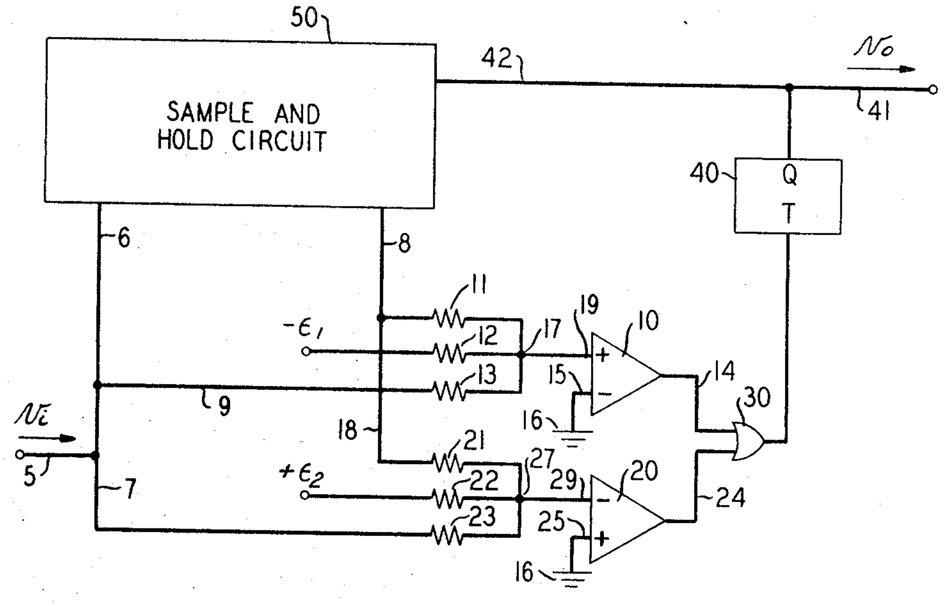
FIG. 1 depicts a circuit schematic of the basic trigger circuit.

The trigger circuit, shown in its most basic form in FIG. 1, comprises a sample and hold circuit 50, first and second differential amplifiers 10 and 20, and assorted logic circuitry. Included in this logic circuitry are OR gate 30, monostable circuit 40, and summing resistors 11–13 and 21–23, which are of substantially equal resistive value. The circuit is configured such that an analog input voltage $v_i$ which may, for instance, represent an experimental parameter which is to be recorded, is coupled through lead 5 to a sampling input 6 of sample and hold circuit 50.

Sample and hold circuit 50 is any conventional sample and hold circuit having an inverting output 8 and a trigger input 42 for controlling the sampling rate of the circuit. The "last look" at input voltage $v_i$ is coupled from inverting output 8 of the sample and hold circuit through resistor 11 to a current summing point 17. Output 8 is inverting in the sense that the polarity of the signal representing the "last look" at $v_i$ on output 8 is opposite that of the signal representing the "last look" at $v_i$ which was coupled into the sample and hold circuit of sampling input 6. In addition, the current value of input voltage $v_i$ is coupled on leads 5 and 9 through resistor 13 to summing point 17 and a negative incremental voltage $\epsilon_1$ is coupled through resistor 12 to summing point 17. Summing point 17 is connected to a noninverting input 19 of amplifier 10.

Amplifier 10 is any high-gain operational amplifier which is suitable for handling signals in the range of $v_i$, and which has both inverting and noninverting inputs. In this particular application, inverting input 15 of amplifier 10 is connected to a point of reference potential 16. Amplifier 10 is biased such that any signal of positive polarity with respect to point of reference potential 16 which appears at noninverting input 19 will result in a positive signal appearing at the output of the amplifier, and any signal of a negative polarity at input 19 will result in a negative signal appearing at the output of the amplifier.

Similarly, the "last look" at input voltage $v_i$ is also coupled from sample and hold circuit 50 through inverting output 8, lead 18, and resistor 21 to a current summing point 27, and the input voltage $v_i$ and a positive voltage increment $\epsilon_2$ are respectively coupled through lead 7 and resistor 23 and through resistor 22 to the same summing point. Summing point 27 is in turn connected to an inverting input 29 of amplifier 20, and a noninverting input 25 of amplifier 20 is connected to point of reference potential 16. Like amplifier 10, amplifier 20 is a high-gain differential amplifier having both inverting and noninverting inputs. However, unlike amplifier 10, amplifier 20 is biased such that any negative signal with respect to point of reference potential 16 which appears at input 29 will result in a positive signal being generated at the output of the amplifier and any positive signal at input 29 will result in a negative signal being generated at the output of the amplifier.

The outputs of amplifiers 10 and 20 are respectively coupled to inputs 14 and 24 of an OR gate 30, which is any conventional logic gate suitable for performing the logical OR function on positive signals of the amplitude produced at the outputs of amplifiers 10 and 20. OR gate 30 is configured so as not to respond to input signals of a negative polarity. The output of OR gate 30 is connected to the trigger input T of monostable circuit 40, which is capable, when triggered, of producing a pulse having a width sufficient to trigger sample and hold circuit 50. Whenever a positive signal is generated by either of amplifiers 10 or 20, an output signal is generated by OR gate 30 and coupled to input T of monostable circuit 40. The output pulse generated by monostable circuit 40 at output Q is utilized both as the output $v_o$ of the circuit and as a trigger signal which, when fed back into the trigger input 42 of sample and hold circuit 50, causes the sample and hold circuit to sample a new value of the input voltage $v_i$.

In short, the trigger circuit functions as follows. An initial value of the input voltage $v_i$ is stored in sample and hold circuit 50 in a manner which will hereinafter be described in more detail. As long as the input voltage $v_i$ does not increase by an amount greater than the magnitude of $\epsilon_1$, both amplifiers 10 and 20 will generate only negative output signals, because in these circumstances a negative potential exists at noninverting input 19 of amplifier 10 and a positive potential exists at inverting input 29 of amplifier 20. Similarly, as long as the input voltage $v_i$ does not decrease by an amount greater than the magnitude of $\epsilon_2$, both amplifiers 10 and 20 will continue to generate only negative output signals because a negative potential exists at noninverting input 19 of amplifier 10 and a positive potential exists at inverting input 29 of amplifier 20. However, if the input voltage $v_i$ should increase by an amount greater than the magnitude of $\epsilon_1$, a positive potential is generated at noninverting input 19 of amplifier 10 and a positive output signal is then generated by amplifier 10. Under this condition, monostable circuit 40 is triggered into generating the desired output pulse, causing sample and hold circuit 50 to obtain a new sample of the latest value of $v_i$. In like manner, if the input voltage $v_i$ should decrease by an amount greater than the magnitude of $\epsilon_2$, a negative potential is present at inverting input 29 of amplifier 20 and a positive signal appears at the output of the amplifier 20. The positive output signal generated by amplifier 20 triggers monostable circuit 40 into generating an output pulse, which in turn causes a new sample of the input voltage $v_i$ to be taken by sample and hold circuit 50. As soon as the new sample of input voltage $v_i$ is taken, the noninverting and inverting inputs of amplifiers 10 and 20 are driven to negative and positive values, respectively, and the outputs of both amplifiers are driven to negative values. This condition prevails until the input voltage $v_i$ either increases by an amount greater than the magnitude of increment $\epsilon_1$ or decreases by an amount greater than the magnitude of increment $\epsilon_2$ with respect to the newly sampled value of $v_i$.

Figure 2:
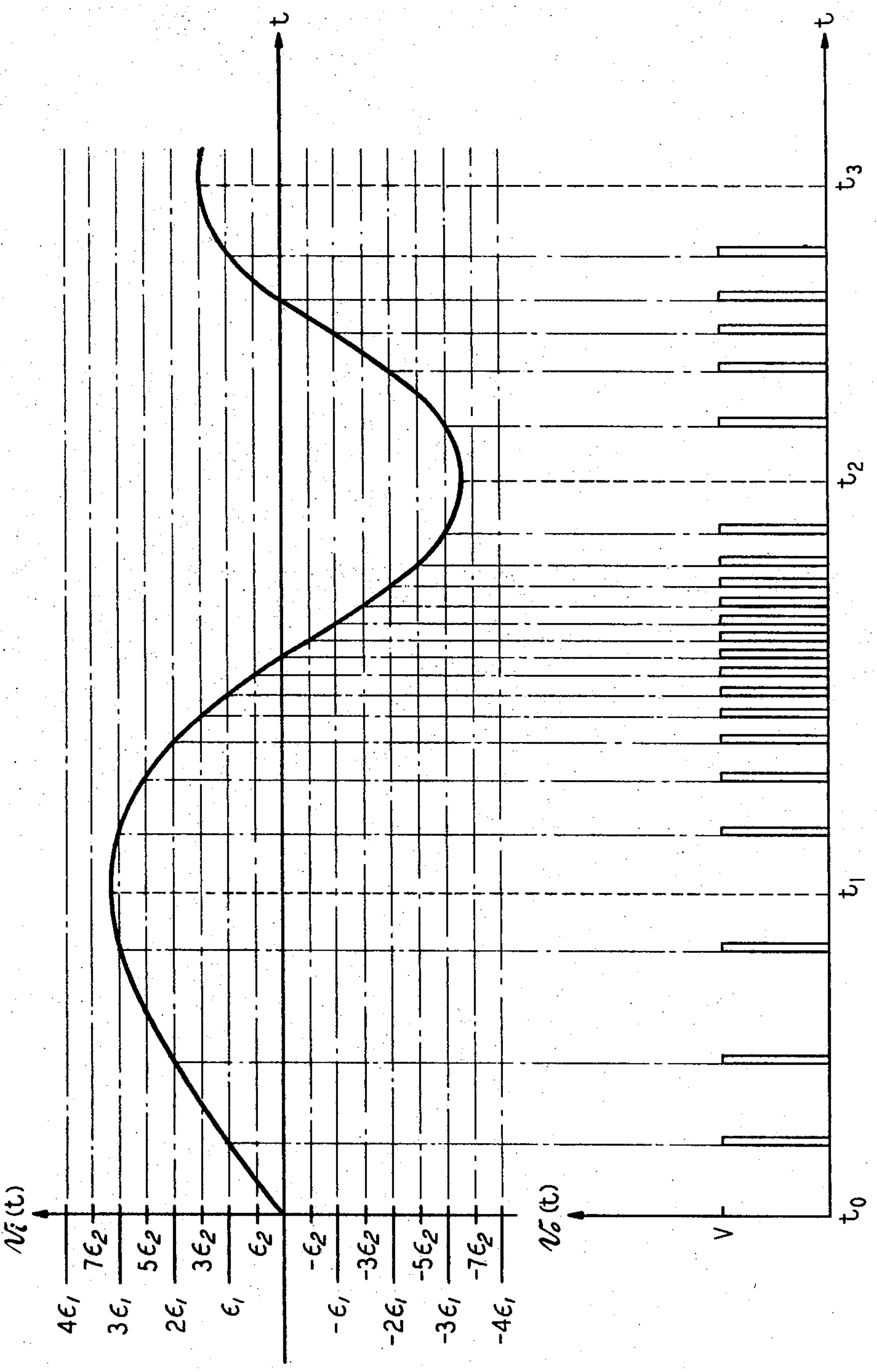
FIG. 2 illustrates an amplitude-versus-time plot of the manner in which the trigger circuit responds to an arbitrary analog input waveform.

An illustrative comparison of the output signal $v_o$ generated by the trigger circuit as a function of an arbitrary input waveform $v_i$ is shown in the amplitude-versus-time plots of $v_o$ and $v_i$ which are depicted in FIG. 2. As is apparent from the figure, the output voltage $v_o$ is a train of pulses of amplitude V. For the purpose of illustration, the magnitude of voltage increment $\epsilon_1$ has been chosen to be approximately equal to the magnitude of $2\epsilon_2$. When $v_i$ is shown increasing with respect to time in the intervals between time $t_0$ and time $t_1$ and between time $t_2$ and time $t_3$, $v_o$ constitutes a digital pulse train having an instantaneous duty cycle which is proportional to the instantaneous time rate of change of $v_i$ at any time during these intervals. The instantaneous duty cycle of $v_o$ is, of course, inversely proportional at any time to the interval between the last two pulses generated in the pulse train $v_o$. As can be seen from the figure, a pulse is generated at the output each time $v_i$ increases by an amount equal to the magnitude of $\epsilon_1$.

Similarly, $v_o$ also has an instantaneous duty cycle which is proportional to the instantaneous time rate of change of $v_i$ over the interval between time $t_1$ and time $t_2$. However, as is apparent from FIG. 2, in this interval, an output pulse is generated each time $v_i$ decreases by an amount equal to the magnitude of $\epsilon_2$. Since the magnitude of $\epsilon_1$ has been chosen for illustrative purposes to be equal to the magnitude of $2\epsilon_2$, it follows that when $v_i$ is decreasing the time rate of change of $v_i$ is effectively computed twice as frequently as when $v_i$ is increasing. Of course, if the magnitude of $\epsilon_1$ had been chosen to equal to the magnitude of $\epsilon_2$, the time rate of change of $v_i$ would be computed uniformly irrespective of whether $v_i$ was increasing or decreasing at the time of computation. Finally, if the magnitude of $\epsilon_1$ had been chosen equal to half of the magnitude of $\epsilon_2$, the time rate of change of $v_i$ when $v_i$ was increasing would effectively be computed at twice the rate that it would be computed when $v_i$ was decreasing.

Thus, it should be apparent from FIG. 2 and the foregoing description of the invention that the time rate of change of $v_i$ can be computed at a different frequency when $v_i$ is increasing than when $v_i$ is decreasing and that the relative proportion between these frequencies depends upon the selection of the ratio between the magnitudes of $\epsilon_1$ and $\epsilon_2$. As a result, it is possible to utilize this feature of the trigger circuit to explore for brief minor inflections in the behavior of an experimental parameter which otherwise varies in a predictable direction. For instance, by letting $|\epsilon_2| << |\epsilon_1|$ it is possible to detect and record a minute decrease in a parameter which otherwise increases by relatively large amounts over the recording interval.

Figure 3:
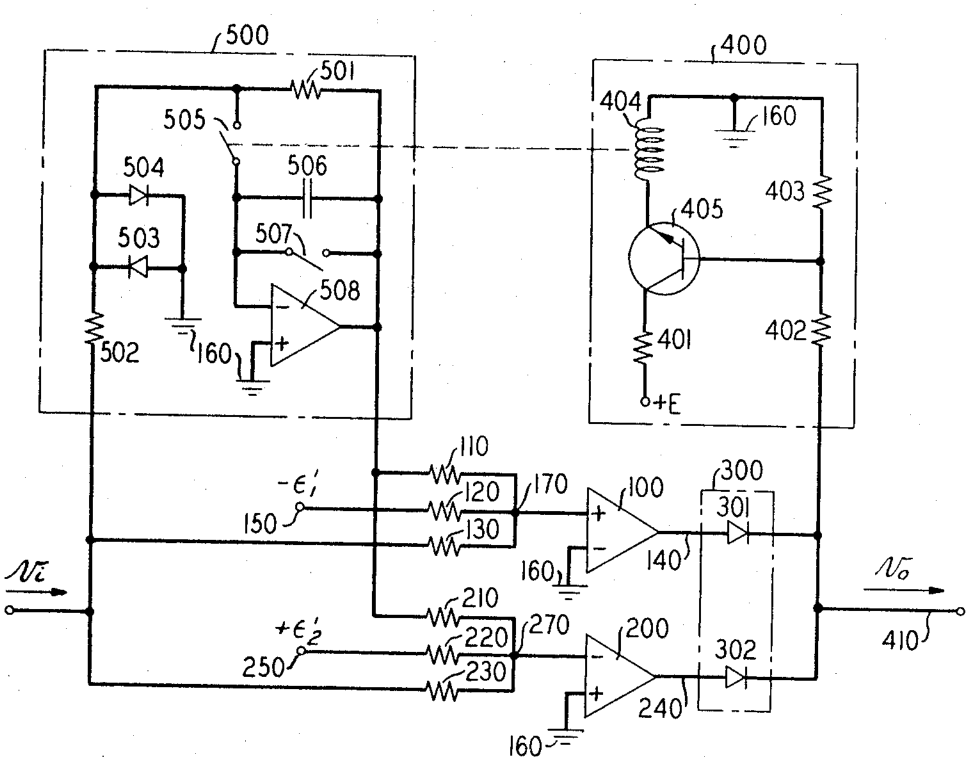
FIG. 3 shows a detailed circuit schematic of an illustrative embodiment of the trigger circuit.

A detailed schematic of the trigger circuit which depicts an illustrative method of implementing sample and hold circuit 500, OR gate 300, and monostable circuit 400 is shown in FIG. 3. Briefly, these components interrelate with each other as follows. Monostable circuit 400 comprises a transistor 405 which is biased OFF through base biasing resistors 402 and 403, a collector load resistor 401 and a collector voltage source +E. When a positive output is generated by OR gate 300, which is comprised of a pair of diodes 301 and 302, the positive signal is coupled through base biasing resistor 402 to the base terminal of transistor 405. Transistor 405 then turns ON for the duration of the signal, thereby activating relay coil 404, which is located in the emitter circuitry of the transistor. Activation of the relay coil causes a momentary closure of relay contacts 505 in sample and hold circuit 500. The closure of relay contacts 505 in turn results in the storing of the latest value of the input voltage $v_i$ in the holding amplifier configuration which includes resistor 501, capacitor 506, switch 507, relay contacts 505, and an inverting operational amplifier 508.

Initiation of the trigger circuit is achieved by momentarily closing relay contacts 505 after switch 507 has been closed and then opened. When this occurs, the initial value of the input voltage $v_i$ is stored on capacitor 506. Switch 507 remains open for the duration of the operation of the circuit and the trigger circuit operates asynchronously with the latest value of $v_i$ being stored in capacitor 506 each time relay contacts 505 are momentarily closed. Sample and hold circuit 500 also includes an input resistor 502 and a pair of diodes 503 and 504 which are connected in an inverted parallel combination between the input circuitry and ground for the purpose of establishing a near-zero potential at the junction of resistors 502 and 506 when switch 505 is open.

An example of the relative values of some of the key elements of this embodiment of the invention are are follows: resistors 110, 120, 130, 210, 220, and 230 — 100,000 ohms; resistors 502 and 501 — 10,000 ohms; capacitor 506 — 0.05 microfarads; and resistors 402 and 403 — 15,000 ohms.

Although the present invention has been described in connection with particular applications and embodiments thereof, it is intended that all additional modifications, applications, and embodiments which will be apparent to those skilled in the art in light of the teachings of the invention be included within the spirit and scope of the invention.

What is claimed is:

1. An asynchronous trigger circuit comprising:
- means for controllably sampling an analog signal;
- means for comparing the sampled value of said signal with the instantaneous value of said signal, said comparing means including means for generating an output signal whenever the instantaneous value of said analog signal changes by a predetermined incremental value with respect to said sampled value of said signal; and
- means responsive to said output signal for controlling said sampling means to take a new sample of said analog signal.

2. The trigger circuit in accordance with claim 1 in which
- said sampling means includes means responsive to a control pulse for triggering the sampling and holding of the instantaneous value of said analog signal;
- said comparing means includes a first amplifier for generating a first signal of a predetermined polarity whenever the instantaneous value of said analog signal exceeds the sampled value of said analog signal by a first incremental amount;
- said comparing means includes a second amplifier for generating a second signal of said predetermined polarity whenever the sampled value of said analog signal exceeds the instantaneous value of said analog signal by a second incremental amount;
- said generating means includes means responsive to either of said first or said second signals for generating a control pulse of a predetermined width; and
- said controlling means includes means for coupling said control pulse to said triggering means of said sampling means.

3. An asynchronous trigger circuit comprising:
- means responsive to a control signal for sampling and holding an analog input signal;
- means for inverting the sampled value of said input signal;
- first means for summing said input signal, the inverted sampled value of said input signal, and a first incremental signal of a first polarity to form a first sum signal;
- second means for summing said input signal, said inverted sampled value of said input signal, and a second incremental signal of a second polarity to form a second sum signal;
- means for inverting said second sum signal;
- means responsive to said first and said inverted second sum signals when said sum first signal and said inverted second sum signal are of said second polarity for controlling said sampling and holding means.

4. The trigger circuit in accordance with claim 3 in which
- said first summing means includes first, second, and third resistors which are commonly connected to a first current summing point, said input signal being coupled through said first resistor to said first summing point, the inverted sampled value of said input signal being coupled from said inverting means through said second resistor to said first summing point, and said first incremental signal being coupled through said third resistor to said first summing point; and
- said second summing means includes fourth, fifth, and sixth resistors which are commonly connected to a second current summing point, said input signal being coupled through said fourth resistor to said second summing point, the inverted sampled value of said input signal being coupled from said inverting means through said fifth resistor to said second summing point, and said second incremental signal being coupled through said sixth resistor to said second summing point.

5. The trigger circuit in accordance with claim 4, said trigger circuit further comprising:
- a first amplifier having inverting and noninverting inputs and an output where said first sum signal is provided, said first summing point being connected to said noninverting input of said first amplifier and said inverting input of said first amplifier being connected to a point of reference potential.

6. The trigger circuit in accordance with claim 5 in which
- said inverting means includes a second amplifier having inverting and noninverting inputs and an output where said second sum signal is provided, said second summing point being connected to said inverting input of said second amplifier and said noninverting input of said second amplifier being connected to said point of reference potential.

7. The trigger circuit in accordance with claim 6 in which
- said controlling means includes a logical OR gate which only passes signals of said second polarity; and said controlling means includes a monostable circuit responsive to signals passed by said OR gate for providing a digital pulse of a width sufficient to trigger said sampling and holding means into sampling and holding a new value of said input signal.

8. The trigger circuit in accordance with claim 7 in which said controlling means includes a relay circuit for coupling said digital pulse to a trigger input of said sampling and holding means, the coil of said relay being included in said monostable circuit and the contacts of said relay being included in said sampling and holding means.

9. The trigger circuit in accordance with claim 8 in which said OR gate is comprised of a first diode serially connected between the output of said first amplifier and a third current summing point and a second diode serially connected between the output of said second amplifier and said third current summing point.

10. An asynchronous method for providing a train of binary pulses, the instantaneous duty cycle of which is proportional to the time rate of change of a dynamically varying analog input signal, said method comprising the steps of sampling the instantaneous value of said input signal in response to a control signal;

holding the sampled signal;

inverting the sampled signal;

providing a first sum of the inverted sampled signal, the current instantaneous value of said input signal, and a first incremental signal of a first polarity;

providing a second sum of said inverted sampled signal, said current instantaneous value of said input signal, and a second incremental signal of said second polarity;

generating a binary control signal if said first sum is a signal of said second polarity or if said second sum is a signal of said first polarity; and utilizing each such control signal for controlling the sampling of a new value of said input signal.

* * * * *